Figure 1:
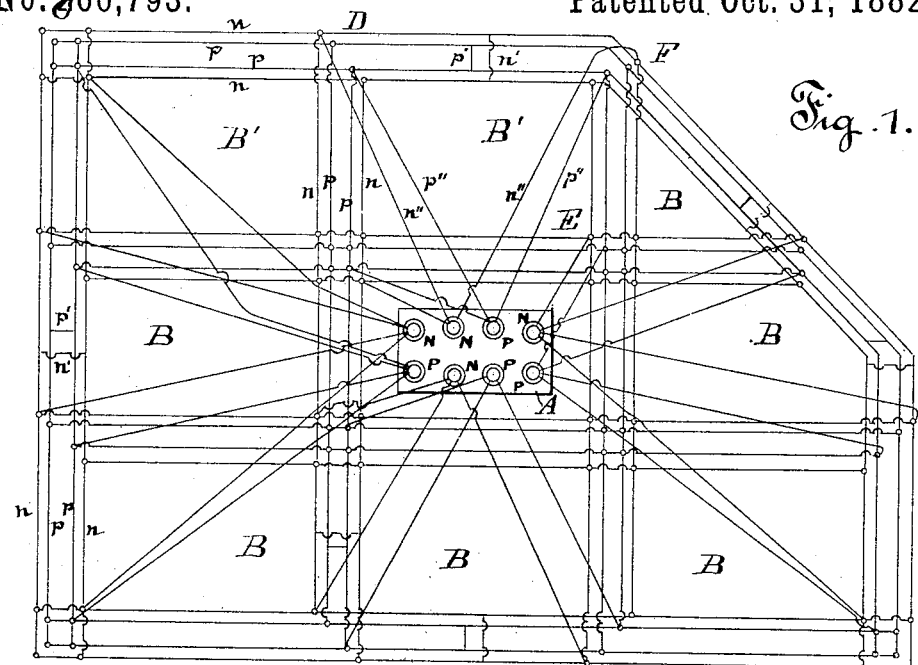

(No Model.)

T. A. EDISON.

ELECTRIC DISTRIBUTION SYSTEM.

No. 266,793. Patented Oct. 31, 1882.

WITNESSES:

D. D. Mott
M. J. Clagett

INVENTOR:

T. A. Edison
BY Dyer & Wilber
ATTORNEYS.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

ELECTRIC DISTRIBUTION SYSTEM.

SPECIFICATION forming part of Letters Patent No. 266,793, dated October 31, 1882.

Application filed December 9, 1881. (No model.)

*To all whom it may concern:*

Be it known that I, THOMAS A. EDISON, of Menlo Park, in the county of Middlesex and State of New Jersey, have invented a new and useful Improvement in Electrical Distribution Systems, (Case No. 361;) and I do hereby declare that the following is a full and exact description of the same, reference being had to the accompanying drawings, and to the letters of reference marked thereon.

In a system of electric lighting in which a town or village or a portion thereof is supplied from one central station it may sometimes occur that the district supplied is irregular in shape, and that in some parts of the district more lights may be used, and consequently more electricity required, than in others.

The object of this invention is to so arrange the system of conductors supplying the district that the supply in the various localities of the district will be proportioned to the demand.

In a prior application I have set forth the manner in which I usually prefer to arrange my conductors in cases where about the same supply is required all over the district, viz: Along each face of each block in the district are laid two conductors—one "positive," the other "negative"—and at every street-corner where the conductors intersect each other all the positive conductors are connected together and all the negative—that is, wherever two conductors of the same name cross each other they are connected together—and feeding-conductors connect with these street-mains at certain definite and regularly-arranged points, so that a constant amount of electricity is supplied in all parts of the district in a uniform manner; but where, as explained above, the district is irregular in shape and some parts of it require more current than others this arrangement is modified as follows: By estimating the number of lamps or other translating devices used in the entire district and the proportion used in various parts thereof, I am enabled to discover what may be termed the "centers of consumption"—that is, the points in the neighborhood of which or around which a certain amount of electricity is consumed.

In parts of the district which are thickly settled and contain a good many consumers of electricity the center of consumption would be the center of a very small space, while in sparsely-inhabited localities, where few lamps are used, the space surrounding the center of consumption would be larger. The district might thus be considered as divided into irregularly-shaped sub-districts, each containing about the same number of lamps, and each consuming approximately the same amount of energy. To each of these centers of consumption is run from the central station a "feeding-circuit", consisting of a positive and a negative conductor, each of which is connected at the proper point to a similar conductor of the main system. As stated above, all the positive and all the negative main conductors are connected together wherever they intersect. I sometimes find it desirable to connect them also at other points by running cross-connections across the street at various places along the faces of the blocks.

The feeding-conductors are preferably of the form set forth in my prior application, (Serial No. 31,825,) with the exception that small additional wires are laid in the tubes, which form additional circuits, each of which runs from a center of consumption back to the central station, where it passes through an electro-dynamometer or other suitable device for indicating electric pressure, and thence returns again to the center of consumption, so that the amount of energy used in each feeding-circuit or the electrical potential at center of consumption is indicated, and adjustable resistances are placed in each feeding-circuit, so that according to the indications of the electro-dynamometer more or less current may be supplied to the circuit. The main conductors of the consumption-circuit are made of such size that the drop in electro-motive force upon them will not be sufficient to vary practically the candle-power of the lamps, while upon the feeding-conductors any drop may be provided for without affecting the relative candle-power of the lamps of the consumption-circuit, such feeding-conductors having no translating devices connected therewith. The loss upon the feeding-conductors is preferably greater than that upon the main conductors of the consumption-circuit, but will be varied in different localities according to the relative cost of copper for conducting purposes and horse-power for generation. The electro-dynamometer used is preferably that of Weber, a large resistance—say 10,000 ohms—being placed in circuit with the instrument, as is well understood, so that the instrument will vary with the variations in tension, and will practically indicate the electro-motive force of the current.

Figure 2:
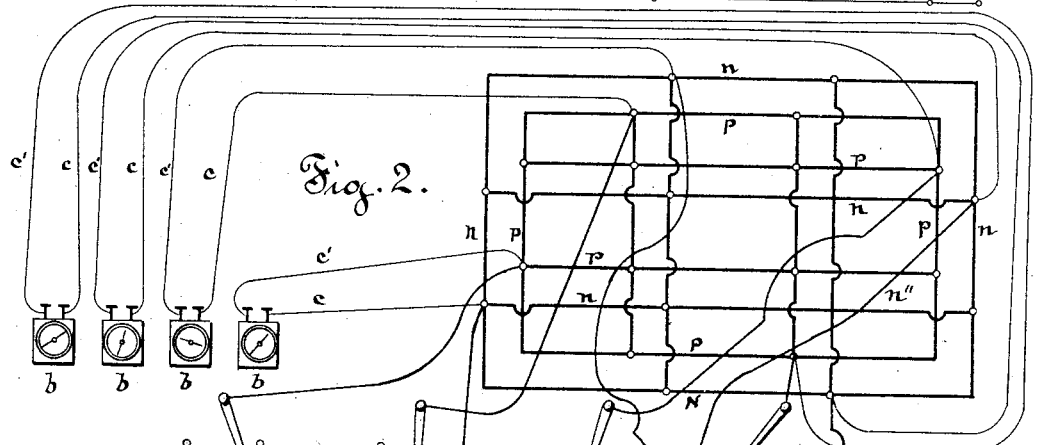
Figure 3:
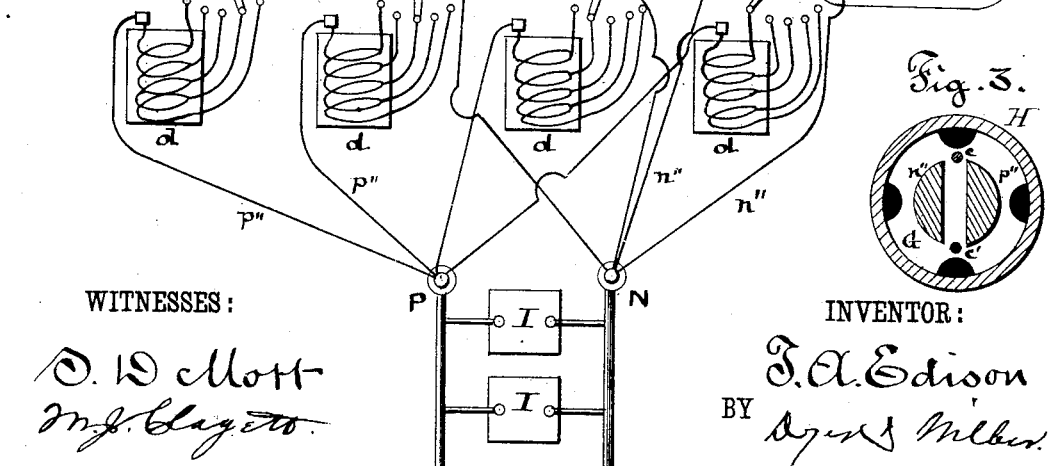

In the accompanying drawings, Figure 1 is a diagram of a district, showing the system of mains and feeding-circuits; Fig. 2, a diagram showing a part of the district, with a portion of the apparatus used at the central station; and Fig. 3 is a cross-section of one of the underground tubes containing the conductors of a feeding-circuit.

A, Fig. 1, represents a central station; N and P, respectively the negative and positive poles of batteries of electric generators situated in the station. B B' B'' are blocks which compose the district or part of it. The blocks B' B'' may be taken as types of all the others. In each of the streets surrounding these blocks are laid the main conductors $p$ $n$, $p$ representing positive and $n$ negative conductors.

Wherever conductors of the same name cross each other they are run into a junction-box and connected, and additional connections may also be made between them by cross-conductors $n'$ $p'$, placed across the street at various points along the faces of the blocks.

The centers of consumption are, as before explained, various irregularly-located points at different distances from the source of supply, A, such as the points C D E F. To these points are run the feeding-circuits, each consisting of a positive conductor, $p''$, and a negative conductor, $n''$. The conductors $p''$ all run from positive poles P of the generators and the conductors $n''$ from negative poles N. By these feeding-circuits electricity is supplied to the different groups of lamps, each of which surrounds a center of consumption.

In Fig. 3, $n''$ $p''$ are the feeding-conductors, surrounded by insulating-washer G, which separates them from an inclosing metal tube, H. $c c'$ are small wires, which also pass through the tube H.

Fig. 2 illustrates the manner in which the conductors surrounding any block B of the district are arranged.

I I represent a battery of electric generators, N P being respectively its negative and positive poles, from which run the feeding-conductors $n''$ $p''$ to the centers of consumption of the block, where they are connected to the street-conductors $n$ $p$ by means of the junction-boxes described in a prior application.

For convenience in the drawings, the wires $c c'$, which are inclosed in the same tube with the conductors $n''$ $p''$, are shown separated from these conductors in Fig. 2. These wires $c c'$ form an auxiliary circuit to each feeding-circuit, passing through electro-dynamometers $b b$ or other suitable devices for indicating electric pressure at the central station, which by this means indicate the electrical potential at the centers of consumption.

$d d$ are adjustable resistances, placed in the feeding-circuits, by means of which more or less current may be made to pass through such circuits, according to the indications of the electro-dynamometers.

What I claim as my invention is—

1. In a system of electrical distribution, the intersecting and connected positive conductors and the intersecting and connected negative conductors, forming the main conductors of the consumption-circuit, upon which the drop in electro-motive force is not sufficient to vary practically the candle-power of the lamps, in combination with a central station and feeding-conductors having no translating devices connected therewith, and extending from the source of electrical energy at the central station to the main conductors of the consumption-circuit, said feeding-conductors being connected with such main conductors of the consumption-circuit at or near centers of consumption, substantially as set forth.

2. The combination, with a feeding-circuit of an electrical distribution system, of an auxiliary circuit composed of smaller conductors connected at its terminals with the terminals of the feeding-circuit, and containing a suitable device for indicating electric tension, so that the electro-motive force of the current in the main circuit is indicated, substantially as set forth.

3. The combination of the conductors forming a circuit of an electrical distribution system, placed in an inclosing tube, of smaller conductors in the same tube, having their terminals connected with those of the main conductors, and forming a circuit in which is placed a suitable device for indicating electric tension, substantially as and for the purpose set forth.

4. In a system of electrical distribution, the combination of the intersecting and connected positive conductors and the intersecting and connected negative conductors, forming the main conductors of the consumption-circuit, with cross-connections connecting the conductors of the same polarity together between the points of intersection, a central station, and feeding-conductors having no translating devices connected therewith, and extending from the source of electrical energy at the central station to the main conductors of the consumption-circuit at or near centers of consumption, substantially as set forth.

5. In a system of electrical distribution, the intersecting and connected positive conductors and the intersecting and connected negative conductors, forming the main conductors of the consumption-circuit, in combination with a central station, feeding-conductors extending from the central station to the consumption-circuit, and having no translating devices connected therewith, and means located in each feeding-circuit for regulating the tension of the current supplied thereby to the consumption-circuit, substantially as set forth.

6. In a system of electrical distribution, the intersecting and connected positive conductors and the intersecting and connected negative conductors, forming the main conductors of the consumption-circuit, in combination with a central station, feeding conductors extending from the central station to the consumption-circuit, and having no translating devices connected therewith, an auxiliary circuit extending to the outer end of each feeding-circuit and containing a device for indicating electro-motive force, and an adjustable resistance in each feeding-circuit, substantially as set forth.

This specification signed and witnessed this 25th day of October, 1881.

THOS. A. EDISON.

Witnesses:
   H. W. SEELY,
   RICHD. N. DYER.